US010353616B1

(12) United States Patent
Tao et al.

(10) Patent No.: US 10,353,616 B1
(45) Date of Patent: Jul. 16, 2019

(54) MANAGING DATA RELOCATION IN STORAGE SYSTEMS

(71) Applicant: EMC Corporation, Hopkinton, MA (US)

(72) Inventors: Qin Tao, Hopkinton, MA (US); Jun Zeng, Shanghai (CN); Khang Can, Framingham, MA (US); Xiangping Chen, Sherborn, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 626 days.

(21) Appl. No.: 13/929,664

(22) Filed: Jun. 27, 2013

(51) Int. Cl.
G06F 3/06 (2006.01)
G06F 12/02 (2006.01)
G06F 11/30 (2006.01)
G06F 11/00 (2006.01)

(52) U.S. Cl.
CPC .......... *G06F 3/0647* (2013.01); *G06F 3/0649* (2013.01); *G06F 12/02* (2013.01); *G06F 11/002* (2013.01); *G06F 11/3055* (2013.01)

(58) Field of Classification Search
USPC ........................................... 711/165
See application file for complete search history.

(56) References Cited

U.S. PATENT DOCUMENTS

| 8,429,346 B1* | 4/2013 | Chen et al. ............ 711/114 |
| 8,566,483 B1* | 10/2013 | Chen .................. G06F 3/0605 710/18 |
| 2011/0197044 A1* | 8/2011 | Sudo ................ G06F 3/061 711/165 |
| 2012/0173771 A1* | 7/2012 | Hyde, II ............ G06F 3/0613 710/18 |

* cited by examiner

Primary Examiner — Sean D Rossiter
Assistant Examiner — Charles J Choi
(74) Attorney, Agent, or Firm — Krishnendu Gupta; Deepika Bhayana

(57) ABSTRACT

A method is used in managing data relocation in storage systems. Data access activity information is gathered for a set of slices of a storage tier in a data storage system for migrating the set of slices from the storage tier to another storage tier. The data storage system includes a first storage tier and a second storage tier configured such that performance characteristics associated with the first storage tier is superior to the second storage tier. Based on a pattern indicated by the data access activity information, a temperature for the set of slices is determined by applying a predictive analysis technique. Based on the determination, relocation of data is effected in the storage system.

16 Claims, 10 Drawing Sheets ically for allocation from the storage pool.

MANAGING DATA RELOCATION IN STORAGE SYSTEMS

BACKGROUND

Technical Field

This application relates to managing data relocation in storage systems.

Description of Related Art

A traditional storage array (herein also referred to as a "data storage system", "disk storage array", "disk array", or simply "array") is a collection of hard disk drives operating together logically as a unified storage device. Storage arrays are designed to store large quantities of data. Storage arrays typically include one or more storage array processors (SPs), for handling requests for allocation and input/output (I/O) requests. An SP is the controller for and primary interface to the storage array.

A storage array may be thought of as a system for managing a large amount of a resource, i.e., a large number of disk drives. Management of the resource may include allocation of a portion of the resource in response to allocation requests. In the storage array example, portions of the storage array may be allocated to, i.e., exclusively used by, entities that request such allocation.

The administrator of a storage array may desire to operate the array in a manner that maximizes throughput and minimizes response time. In general, performance of a storage array may be constrained by both physical and temporal constraints. Examples of physical constraints include bus occupancy and availability, excessive disk arm movement, and uneven distribution of load across disks. Examples of temporal constraints include bus bandwidth, bus speed, spindle rotational speed, serial versus parallel access to multiple read/write heads, and the size of data transfer buffers.

Large storage arrays today manage many disks that are not identical. Storage arrays use different types of disks and group the like kinds of disks into tiers based on the performance characteristics of the disks. A group of fast but small disks may be a fast tier (also referred to as "higher tier" or "high tier"). A group of slow but large disks may be a slow tier (also referred to as "lower tier" or "low tier"). It may be possible to have different tiers with different properties or constructed from a mix of different types of physical disks to achieve a performance or price goal. Storing often referenced, or hot, data on the fast tier and less often referenced, or cold, data on the slow tier may create a more favorable customer cost profile than storing all data on a single kind of disk.

A storage tier may be made up of different types of disks, i.e., disks with different redundant array of inexpensive disks (RAID) levels, performance and cost characteristics. In the industry there have become defined several levels of RAID systems. RAID (Redundant Array of Independent or Inexpensive Disks) parity schemes may be utilized to provide error detection during the transfer and retrieval of data across a storage system.

Data storage systems, such as disk drives, disk storage arrays, network storage devices, storage area networks, and the like, are called upon to store and manage a significant amount of data (e.g., gigabytes, terabytes, petabytes, etc.) that is written and read by many users. For example, a traditional storage array may include a collection of hard disk drives operating together logically as a unified storage device. Storage arrays are typically used to provide storage space for a plurality of computer file systems, databases, applications, and the like. For this and other reasons, it is common for physical storage arrays to be logically partitioned into chunks of storage space, called logical units, or LUs. This allows a unified storage array to appear as a collection of separate file systems, network drives, and/or volumes.

SUMMARY OF THE INVENTION

A method is used in managing data relocation in storage systems. Data access activity information is gathered for a set of slices of a storage tier in a data storage system for migrating the set of slices from the storage tier to another storage tier. The data storage system includes a first storage tier and a second storage tier configured such that performance characteristics associated with the first storage tier is superior to the second storage tier. Based on a pattern indicated by the data access activity information, a temperature for the set of slices is determined by applying a predictive analysis technique. Based on the determination, relocation of data is effected in the storage system.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
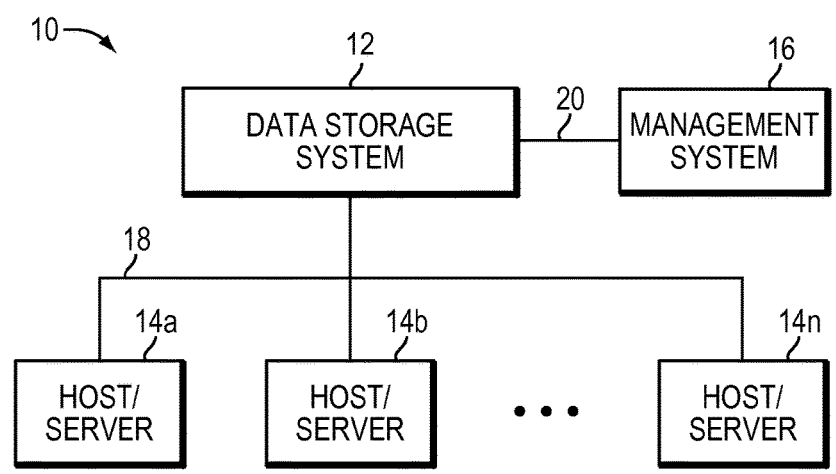
FIG. 1 is an example of an embodiment of a computer system that may utilize the techniques described herein.

Described below is a technique for use in managing data relocation in storage systems, which technique may be used to provide, among other things, gathering data access activity information for a set of slices of a storage tier in a data storage system for migrating the set of slices from the storage tier to another storage tier, where the data storage system includes a first storage tier and a second storage tier configured such that performance characteristics associated with the first storage tier is superior to the second storage tier; based on a pattern indicated by the data access activity information, determining a temperature for the set of slices by applying a predictive analysis technique; and based on the determination, effecting relocation of data in the storage system.

Generally, a storage pool is a collection of storage that is provisioned for a logical unit. A storage pool may be a collection of disks, which may include disks of different types. Storage pools may further be subdivided into slices; for example a 1 gigabyte (GB) slice may be the allocation element for a logical unit. Further, a slice may be 256 megabytes (MB) in size. A pool may include a set of storage tiers. Further, both a storage tier and a pool may have storage devices of different performance capabilities and costs. A slice may be considered the smallest element that can be tracked and moved. It may be advantageous to store the hot or most accessed data on the devices within the storage pool with the best performance characteristics while storing the cold or least accessed data on the devices that have slower performance characteristics. This can lead to a lower cost system having both faster and slower devices that can emulate the performance of a more expensive system having only faster storage devices.

A storage tier or a storage pool may be a collection of storage containers. A storage container may be a unit of storage including a set of storage extents. A storage extent is a logical contiguous area of storage reserved for a user requesting the storage space. For example, a storage tier may include three storage containers, each storage container including a set of disks and the set of disk in each storage container having different RAID levels. Further, a tiered storage pool may include storage with different performance characteristics such that a logical unit created from storage space provisioned from the storage pool may include slices from different storage tiers with different performance characteristics.

A disk may be a physical disk within the storage system. A LUN may be a logical unit number which is an identifier for a Logical Unit. Each slice of data may have a mapping to the location of the physical drive where it starts and ends.

Slice relocation (herein also referred to as a "data relocation" or "data migration") is a process of determining optimal or near optimal data placement among storage objects (e.g., storage tier, RAID group) based on I/O load of the storage objects. Slice relocation helps provide a way to determine respective preferable or best storage locations of slices within a LUN in a storage pool, and to construct a slice relocation candidate list to move slices from their current locations to the respective preferable or best locations. Data migration, i.e., the moving of data from one storage element to another, may be performed at the LUN level or at the slice level. Data migration at the slice level may be performed by copying the data of a slice and then updating an address map of the slice with the new location of the slice. A slice may store data or metadata of the data. I/O operations performed for copying data of a slice in order to relocate the slice are referred to as relocation I/Os.

An automated storage tiering process (also referred to herein simply as "slice relocation process") tracks I/O activity information for slices of a logical unit and relocates the slices among storage tiers in order to improve I/O performance, decrease system runtime cost and reduce disk drive wear by relocating frequently accessed data indicated by hot slices to fast storage tiers and least accessed data on cold slices to slow storage tiers. Generally, an Auto-Tiering policy engine (PE) of a data storage system examines a storage pool's storage configuration and temperatures of all slices in that storage pool, and generates a slice relocation list. The slice relocation list identifies slices to be relocated with respective destination information. In general, slices in a storage pool are matched to the most appropriate respective tiers based on their respective temperatures (e.g., hot, cold) and tier preferences (e.g., High, Low, Optimal). If a slice's current tier differs from its matching tier, the slice is listed in the relocation candidate list. The PE is also referred to herein as the slice relocation process.

Generally, slices are allocated to LUNs in a storage pool as "best-fit" at initial allocation time. In at least some cases, since the I/O load pattern of a slice is not known at initial allocation time, the performance capability of storage allocated may be too high or too low for effective data access on a slice. Furthermore, a data access pattern tends to change over time. Older data is accessed less frequently and therefore in at least many cases does not require storage with higher performance capability. Generally, data of slices is relocated among storage tiers based on the "temperature" of contents of a slice and location of the slice on storage devices. Temperature of each storage slice is an indication of hotness of a slice, in other words, frequency and recency of slice I/Os. Better overall system performance can be achieved by placing hot slices to higher tier and cold slices to lower tier. In general, temperature may correspond to, for example, how often and how recently the data is accessed. For example, hot data may refer to data that has been accessed recently and is accessed often, cold data may refer to data that has not been accessed recently and is not accessed often. Data temperature may be further segmented to include a warm data category that may include data that is less hot than hot data and/or less cold than cold data. Hence, warm data may refer to data that is accessed more often than cold data and less often that hot data.

In a conventional system, the temperature of a slice is determined based on an Exponential Moving Average ("EMA") technique such that I/O activity information (e.g., raw I/O statistics) is gathered for a short period of time (such as last few days) and analyzed to determine the temperature for the slice in such a way that most recent data is used for determining the temperature instead of old data. Thus, in such a convention system, a conventional slice relocation process focuses on a short term trend by making an assumption that if a slice is hot yesterday, there is a high likelihood that the slice is going to be hot tomorrow. Thus, in such a conventional system, a conventional slice relocation process makes an assumption that I/O activity for a slice is same or similar each day. Thus, for example, in such a conventional system, a conventional slice relocation process makes an assumption that I/O load for a slice on Jun. 3, 2013 is either same or similar to respective I/O load for the slice on Jun. 1, 2013 and Jun. 2, 2013. Thus, in such conventional system, long term trends in I/O activity are not taken into consideration when determining the temperature of a slice. Instead, in such a conventional system, the temperature of a slice is determined based on the most recent temperature of the slice (e.g., temperature for the past 2 days).

Further, there may exists a data usage pattern (e.g. time-based pattern) such that data of a slice may be used intensively for a specific period of time on a repeated basis (e.g., generation of a report at the end of each month and year, activities related to tax computations that may occur near the end of a tax year). Thus, the temperature of a slice may exhibit a specific pattern over a specific period of time. Thus, in such a case, I/O load for a slice may reduce significantly at the end of a specific period of time when access to data of the slice finishes. Thus, for example, I/O load for a slice may be high on the first day of each month. Thus, a conventional slice relocation process executing in a conventional system may not be able to accurately predict the temperature of a slice on the first day of a month by using I/O load information of the slice for the previous day which is the last day of the previous month. Further, in such a conventional system, a conventional slice relocation process may not be able to efficiently predict the temperature of slice because a long term data access pattern is not taken into consideration when determining the temperature for the slice. Further, in such a conventional system, a conventional slice relocation process using the EMA technique may not be able to taken into consideration I/O loads that periodically peaks based on a specific pattern (such as a time-based pattern). Consequently, in such a conventional system, the temperature of a slice is determined in a manner which does not take into consideration a specific data access pattern exhibited by I/O load on the slice.

Further, in such a conventional system, a schedule for a slice relocation process is configured manually by a storage administrator. Further, in such a conventional system, a storage administrator may not possess accurate information regarding a specific I/O pattern such as a time-based pattern exhibited by I/O activity performed on a set of slices. Thus, in such a conventional system, a storage administrator is unable to analyze I/O load patterns and adjust a schedule for a slice relocation process based on the I/O load patterns. Thus, in such a conventional system, a conventional slice relocation process does not track data access patterns over a long period of time for predicting the temperature based on a long term trend and thereby unable to dynamically adjust a schedule of the conventional slice relocation process.

By contrast, in at least some implementations in accordance with the technique as described herein, a slice relocation process using the current technique gathers data access activity information (e.g. I/O statistics) over a long period of time for analyzing a specific pattern such as a time-based I/O load pattern based on the data access activity information and applies a predictive analysis technique for determining the temperature of a slice. Thus, in at least one embodiment of the current technique, a slice relocation process automatically relocates slices that may become hot based on respective predicted temperature for each of the slices to fast storage tiers proactively before I/O load increases for the slices and relocates the slices to a low storage tier when I/O load for the slices reduces. Thus, in at least one embodiment of the current technique, an Auto-Tiering policy engine (PE) of a data storage system using the current technique handles different types of I/O activity loads by gathering and analyzing both short term and long term I/O statistics. In at least one embodiment of the current technique, an I/O pattern detector module is created in a storage system to identify a long term data access pattern (such as a long term trend) from I/O activity information gathered for slices of a storage tier. Based on whether a long term data access pattern is detected by the I/O pattern detector module, a predictive analysis technique is applied for determining the temperature for each slice of a storage tier. If a long term data access pattern is not detected by the I/O pattern detector module, the temperature for each slice is determined based on the EMA technique. Further, a final temperature is determined for a slice based on whether the predictive analysis technique provides better temperature prediction than the EMA technique.

In at least some implementations in accordance with the current technique as described herein, the use of the managing data relocation in storage systems technique can provide one or more of the following advantages: lowering storage costs by improving efficiency of the data storage system, improving I/O performance by relocating slices based on efficient determination of a predicted temperature, and reducing the amount of storage required in the data storage system by optimally or nearly optimally utilizing every storage tier of the data storage system and by improving overall performance of the storage tier.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

Given the different performance characteristics, one or more tiers of storage devices may be defined. The physical devices may be partitioned into tiers based on the performance characteristics of the devices; grouping similar performing devices together. An embodiment using the techniques herein may define a hierarchy of multiple tiers. Conversely, the particular performance characteristics may be applied to a storage pool with or without the definition of tiers. The set of resources associated with or designated for use by a tier or grouping within a pool may be characterized as a dynamic binding in that the particular set of data storage system resources utilized by consumers in a tier may vary from time to time. A current configuration for the data storage system, static aspects of the current data storage system resources (e.g., types of devices, device storage capacity and physical device characteristics related to speed and time to access data stored on the device), and current workload and other dynamic aspects (e.g., actual observed performance and utilization metrics) of the data storage system may vary at different points in time.

An Auto-Tiering policy engine (PE) of the data storage system 12 examines a storage pool's storage configuration and temperatures of all slices in that storage pool, and generates a slice relocation list. The slice relocation list identifies slices to be relocated with respective destination information. In general, slices in a storage pool are matched to the most appropriate respective tiers based on their respective temperatures (e.g., hot, cold) and tier preferences (e.g., High, Low, Optimal). If a slice's current tier differs from its matching tier, the slice is listed in the relocation candidate list. The PE is also referred to herein as the slice relocation process.

In certain cases, an enterprise can utilize different types of storage systems to form a complete data storage environment. In one arrangement, the enterprise can utilize both a block based storage system and a file based storage hardware, such as a VNX™ or VNXe™ system (produced by EMC Corporation, Hopkinton, Mass.). In such an arrangement, typically the file based storage hardware operates as a front-end to the block based storage system such that the file based storage hardware and the block based storage system form a unified storage system.

Figure 2A:
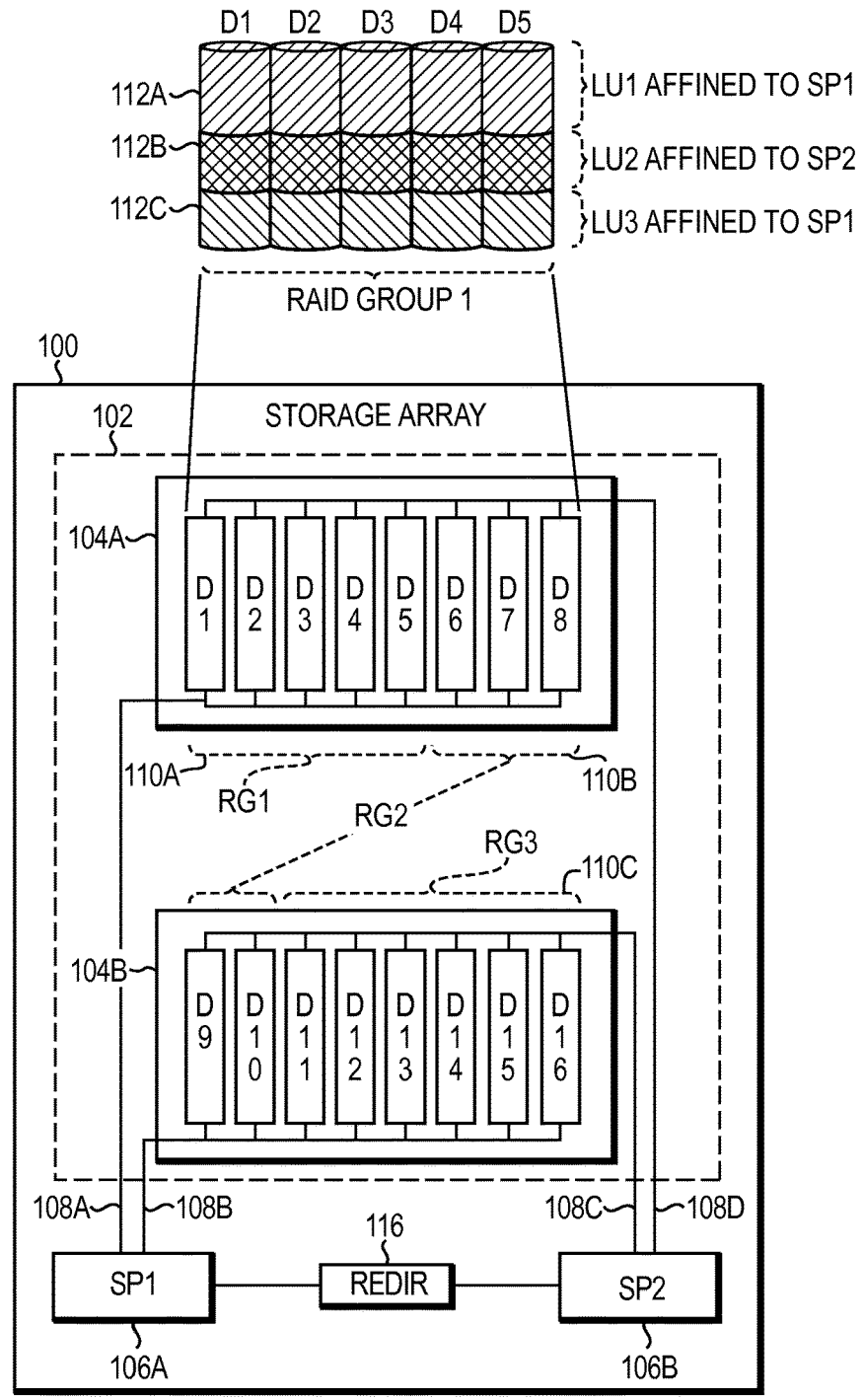
FIGS. 2A and 2B are an example of an embodiment of a computer system that may utilize the techniques described herein.
Figure 2B:
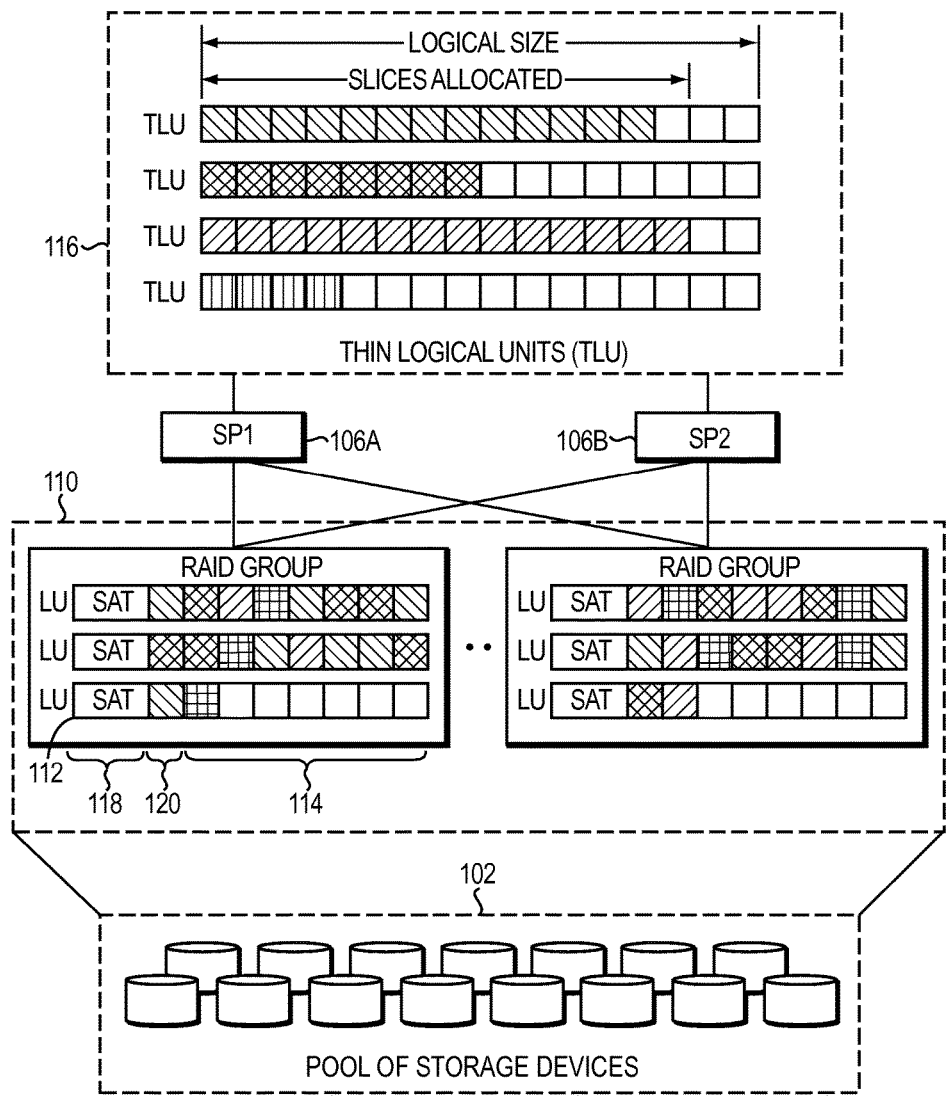

Referring to FIGS. 2A and 2B, shown are examples of an embodiment of a computer system that may be used in connection with performing the techniques described herein. FIG. 2A shows a storage system that comprises a storage array 12. Storage array 12 includes multiple storage devices 102, which are typically hard disk drives, but which may be tape drives, flash memory, flash drives, other solid state drives, or some combination of the above. Storage devices 102 may have various differences in capabilities based on physical characteristics of underlying storage media, e.g., flash memory may be extremely fast compared to tape storage which may be relatively large and cheap. As used herein, storage media may also be referred to as physical media. Storage media may include any of various computer readable media, e.g., hard disks, floppy disks, disks, tapes, discs, solid state memory, optical discs, and flash memory. In at least one embodiment, storage devices 102 may be organized into tiers or classes of storage based on characteristics of associated storage media. For example, flash-based storage device 102 may be tier 1 storage, hard disk-based storage device 102 may be tier 2 storage, and tape-based storage devices 102 may be tier 3 storage.

In at least one embodiment, the storage devices may be organized into multiple shelves 104, each shelf containing multiple devices 102. In the embodiment illustrated in FIG. 2A, storage array 12 includes two shelves, Shelf1 104A and Shelf2 104B; Shelf1 104A contains eight storage devices, D1-D8, and Shelf2 also contains eight storage devices, D9-D16. Storage array 12 may include one or more storage processors 106, for handling input/output (I/O) requests and allocations. Each storage processor 106 may communicate with storage devices 102 through one or more data buses 108. In at least one embodiment, storage array 12 contains two storage processors, SP1 106A, and SP2 106B, and each storage processor 106 has a dedicated data bus 108 for each shelf 104. For example, SP1 106A is connected to each storage device 102 on Shelf1 104A via a first data bus 108A and to each storage device 102 on Shelf2 104B via a second data bus 108B. SP2 106 is connected to each storage device 102 on Shelf1 104A via a third data bus 108C and to each storage device 102 on Shelf2 104B via a fourth data bus 108D. In this manner, each device 102 is configured to be connected to two separate data buses 108, one to each storage processor 106. For example, storage devices D1-D8 may be connected to data buses 108A and 108C, while storage devices D9-D16 may be connected to data buses 108B and 108D. Thus, each device 102 is connected via some data bus to both SP1 106A and SP2 106B. The configuration of storage array 12, as illustrated in FIG. 2A, is for illustrative purposes only, and is not considered a limitation of the current technique described herein.

In addition to the physical configuration, storage devices 102 may also be logically configured. For example, multiple storage devices 102 may be organized into redundant array of inexpensive disks (RAID) groups, or RGs 110, shown in FIG. 1A as RG1 110A, RG2 110B, and RG3 110C. Storage devices D1-D5 are organized into a first RAID group, RG1 110A, while storage devices D6-D10 are organized into a second RAID group, RG2 110B. Storage devices D11-D16 are organized into a third RAID group, RG3 110C. In at least one embodiment, a RAID group may span multiple shelves and/or multiple buses. For example, RG2 110B includes storage devices from both Shelf1 104A and Shelf2 104B.

Although RAID groups are composed of multiple storage devices, a RAID group may be conceptually treated as if it were a single storage device. As used herein, the term "storage entity" may refer to either a single storage device or a RAID group operating as a single storage device. RAID groups (RG) may be created or based on a various factors, including proximity of storage devices, utilization goals, capacity needs, physical characteristics of storage devices 102, and other factors. In at least one embodiment, RGs are based on tiers generally determined by physical characteristics of storage devices (e.g., fast, high quality devices D1-D5 may be tier 1 storage devices, and, as such, may be organized into a given RG 110). Such physical characteristics of storage devices for determining tiers may include but is not limited to capacity of storage device, access speed of storage device (e.g., revolution per minute (RPM) for disk-based media and throughput for solid state media), and type of storage device (e.g., flash, hard disk, and floppy). Further a RAID group may also include storage devices (e.g., disk drives) that are configured from different storage tiers.

In at least one embodiment, storage entities are associated with tiers or classes of storage. Storage entities may be further sub-divided into logical units. A single RAID group or individual storage device may contain one or more logical units. Each logical unit may be further subdivided into portions of a logical unit, referred to as "slices". As used herein, storage area refers to storage space of one or more storage entities in a storage system. Slices may be any size and may be associated with storage media from one or more storage entities. In at least one embodiment, slices are constant-sized portions of storage associated with one storage device 102, or a storage media therein, in storage array 12 (e.g., a 1 gigabyte (GB) slice from D2). In the embodiment illustrated in FIG. 2A, RG1, which includes storage devices D1-D5, is sub-divided into 3 logical units, LU1 112A, LU2 112B, and LU3 112C. Each LU is sub-divided into multiple slices. Further, a user may not access LUs (LU1 112A, LU2 112B, and LU3 112C) as the LUs are referred to as private LUs. However, a user may access a mapped LU which is created from slices of private LUs as described below herein. A mapped LU may also be referred to as a front end logical unit such that a user may allocate the mapped LU for provisioning storage.

FIG. 2B is a block diagram illustrating another view of a data storage system for managing metadata placement in a storage system according to an embodiment of the current technique described herein. In the simplified view shown in FIG. 2B, a pool of storage devices 102 are organized into multiple RAID groups 110, and each RAID group is further divided into a number of LUs from which slices 114 are allocated to one or more mapped LUs for use by users of storage array 12. As used herein, a mapped LU refers to a logical portion of storage space that represent contiguous and/or non-contiguous physical storage space, where mapping allows for physical storage space to be dynamically linked together at a time of use into a logically contiguous address space. Exemplary examples of mapped LUs may include thin logical units (TLUs). A thin logical unit ("TLU") is a sparsely populated logical unit (LU) provisioned at creation but which is not allocated any storage until the storage is actually needed. TLUs 116 may have a logical size that is larger than the actual storage size consumed by TLUs 116. The actual consumed size is determined by the number of slices actually allocated to the TLU 116. Thus, an amount of storage space presented to a host of a data storage system using a thin logical volume may be different than the amount of storage space actually allocated to the thin logical volume. The slices that are allocated to a mapped LUN may be physically located anywhere in storage array 100. As will be discussed in more detail below, these slices may be located more or less contiguously, but they may also be distributed more or less evenly across all physical resources, depending on the slice selection and allocation policy or algorithm. Other physical distributions are within the scope of the current technique claimed herein.

In at least one embodiment, storage processors 106A, 106B are responsible for allocating storage and maintaining information about how that allocated storage is being used. In one implementation of storage array 100, each logical unit 112 is associated with a slice allocation table (SAT) 118, which is used to record information about each slice 114, such as the TLU that is using the slice 114 and whether the slice is free or allocated. The SAT 118 may be stored in the logical unit 112, or it may be stored outside the logical unit 112 to which it is associated.

Figure 3:
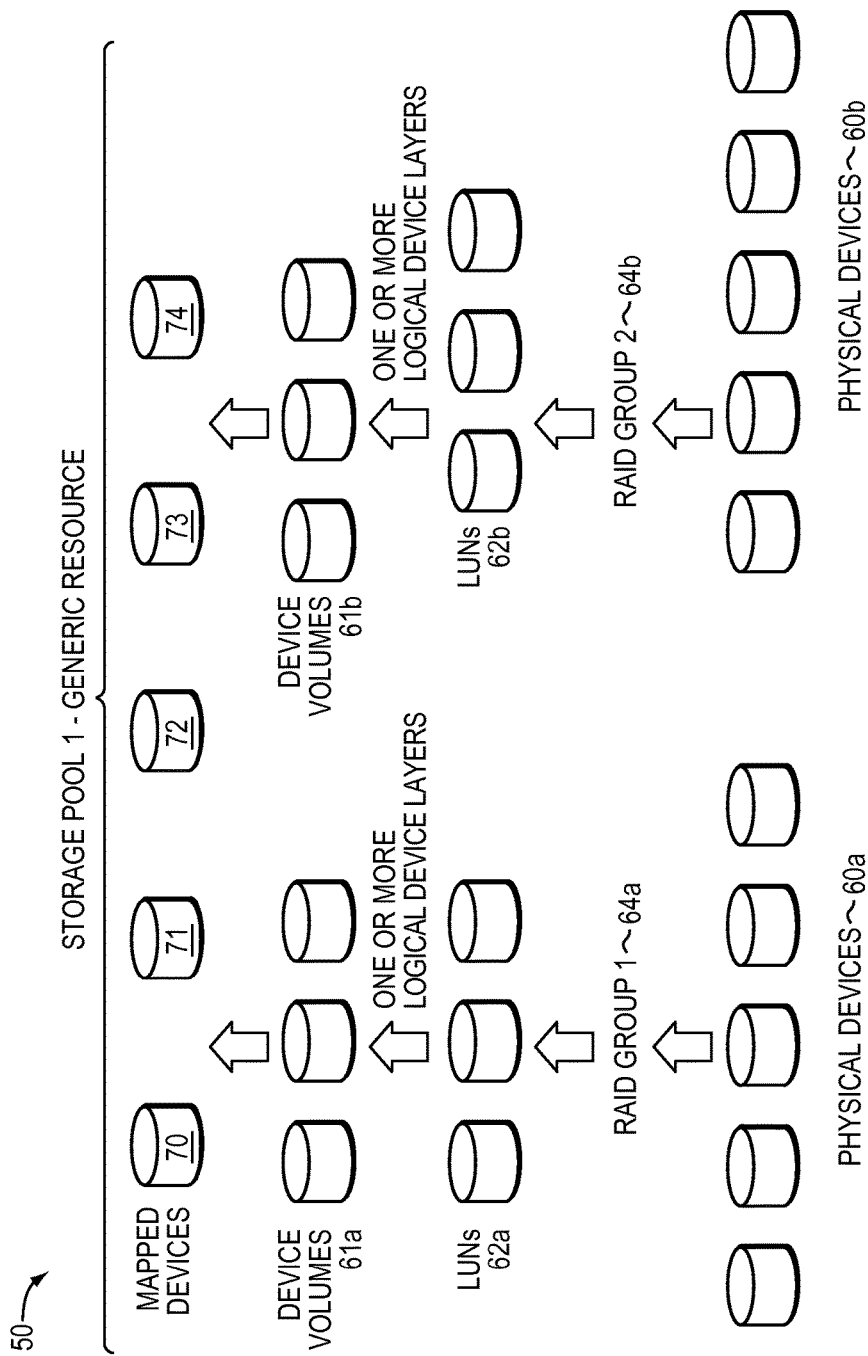
FIG. 3 is an example illustrating storage device layout.

Referring to FIG. 3, shown is an example representing how data storage system best practices may be used to form storage pools. The example 50 illustrates how storage pools may be constructed from groups of physical devices. For example, RAID Group1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used for form a storage pool in an embodiment using RAID techniques.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the mapped device results in either a null pointer (or equivalent) indicating that no corresponding physical storage space has yet been allocated, or results in a reference to a data device which in turn references the underlying physical storage space.

Figure 4A:
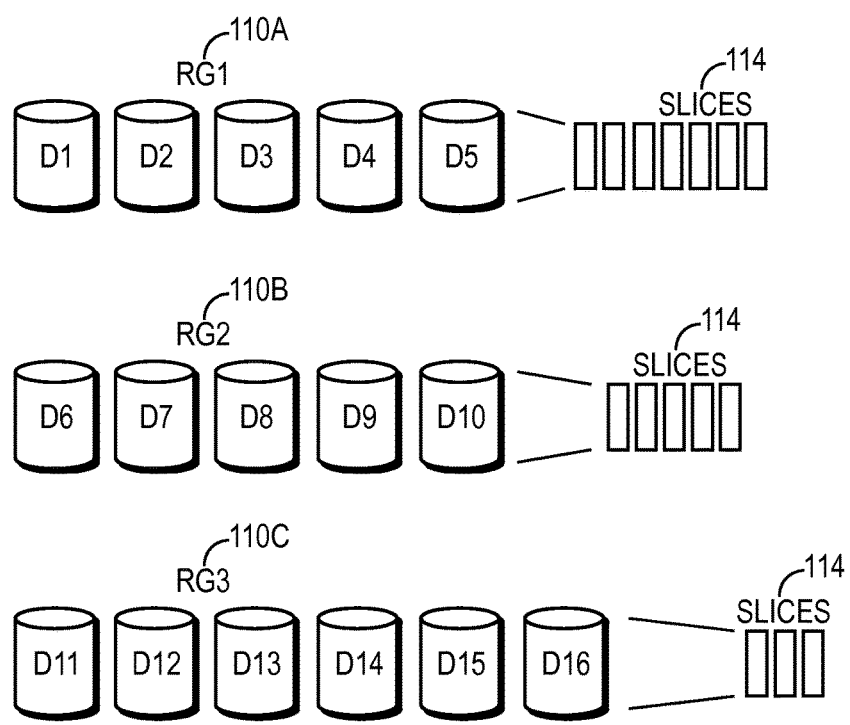
FIGS. 4A and 4B are examples illustrating storage device layout.

Referring to FIG. 4A, shown is a diagram illustrating an exemplary logical division of a storage of a data storage system into storage objects (such as RAID groups) for managing data relocation in the data storage system that may be included in an embodiment using the techniques described herein. With reference also to FIGS. 1-2, for example, storage entities 40 may refer to either a single storage device or a RAID group operating as a single storage device, may be further sub-divided into logical units. A single RAID group or individual storage device may contain one or more logical units (LUs) 40. However, RAID groups need not correspond to LUs and RAID groupings may be further divided into two or more LUs. In addition to RAID groups, each logical unit may be further subdivided into portions of a logical unit, referred to as "slices" 114. Slices 114 may be allocated, de-allocated, re-allocated, reserved, or redistributed by a slice manger. A slice may be, for example, a 1 GB slice of data. However, it should be noted that a slice may be any other size as well, such as 256 megabytes (MB). Further, the techniques described herein should not be construed as being limited to only slices of data; the techniques are equally applicable to other data chunk sizes, such as blocks, slivers (subset of slices), page, file or the like. The slice manager may be a software application or layer that is executed, at least in part, by one or more SPs 46. The slice manager may be responsible for implementing a slice allocation policy and/or algorithm. For example, the slice manager may receive slice allocation requests, and maintain relevant statistical information regarding slices.

Figure 4B:
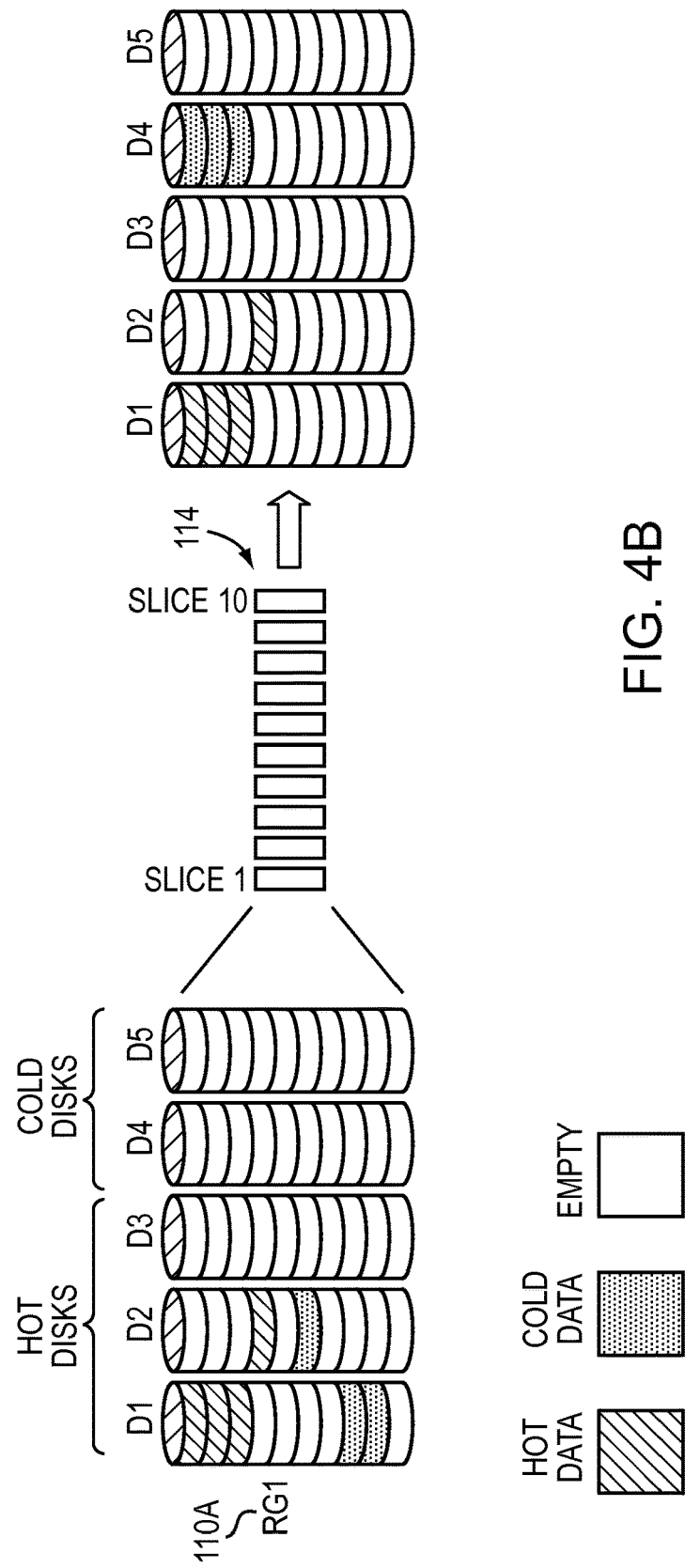

Referring to FIG. 4B, shown is a diagram illustrating another example of logical division of a storage of a data storage system into storage objects (such as RAID groups, storage devices, slices) for managing data relocation in the data storage system that may be included in an embodiment using the techniques described herein. In at least one embodiment, a collection of hard disk drives may be organized into RAID arrays. The collective data storage capacity of storage devices (e.g., RG1 110A) is represented by data storage space. The data storage space may be divided into portions, hereinafter referred to as slices 114 (e.g., SLICE1-SLICE10). In at least one embodiment of the current technique, for example, each slice 114 is approximately 1 gigabyte (GB) in size, but other sizes may be used. Slices 114 within the data storage space may be organized into logical units (LUs), which are commonly referred to as LUNs.

Figure 5:
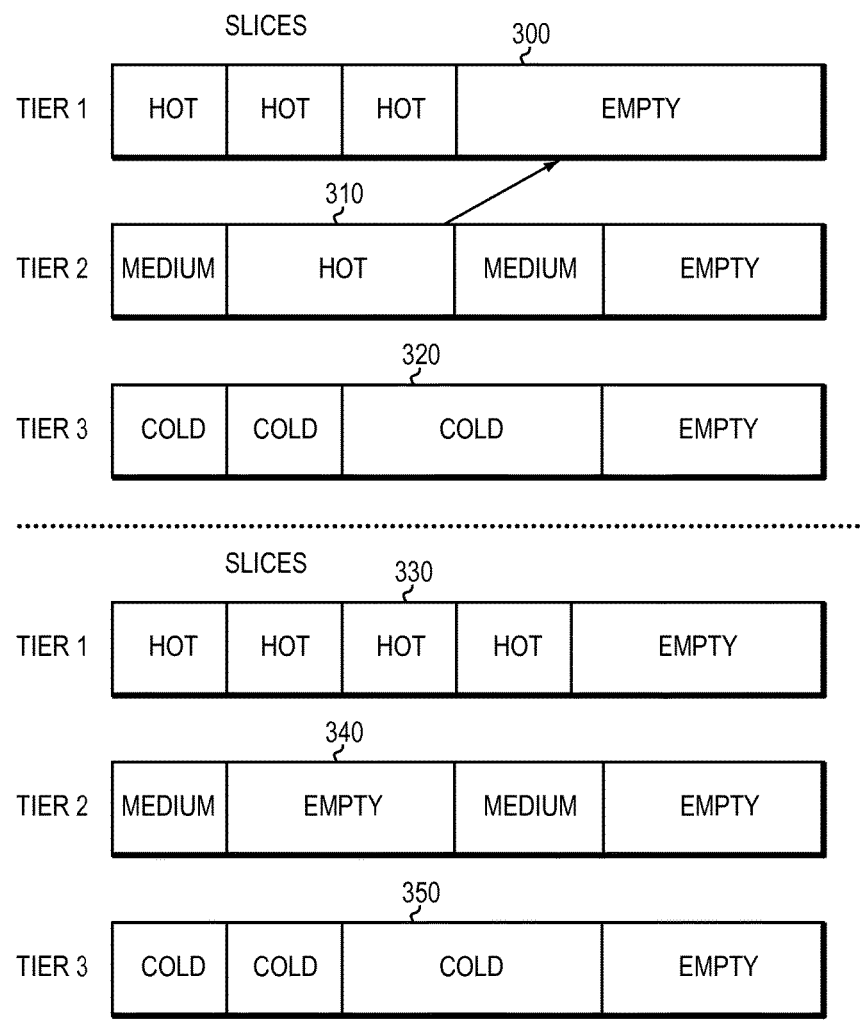
FIGS. 5-7 are block diagrams illustrating in more detail components that may be used in connection with techniques herein.

Referring now to FIG. 5 that illustrates a process of relocating slices from a first storage tier of a storage pool to a second storage tier of the storage pool in a data storage system. In this figure, there are three storage tiers, Tier 1, Tier 2 and Tier 3. Each storage tier includes slices, such as slices 300, 310, and 320. As well, each slice has a temperature associated with it such as hot, cold, or medium. As well, some of the storage tier is also considered empty. Referring to the upper portion of the FIG. 5, there is a hot slice 310 in storage Tier 2. The temperature of a slice may be designated as a scalar or step value that is it may have a numerical equivalent such as 30 degrees or may simply be designated into a bucket, such as cold.

Also shown in the FIG. 5 is that Tier 1 has empty space 300. In this example, Tier 1 may have faster performance characteristics and a higher cost. Conversely, Tier 2 may have slower performance characteristics but a lower cost. This may be seen, for example, in the fact that there is more storage in Tier 2 than there is in Tier 1. Again, in the upper portion of the FIG. 5, it is shown that there is a hot slice 310 in Tier 2 that should be moved to Tier 1. In this example embodiment, as shown in the lower portion of FIG. 5, the hot slice is moved to Tier 1 leaving an empty space 340 in Tier 2.

Figure 6:
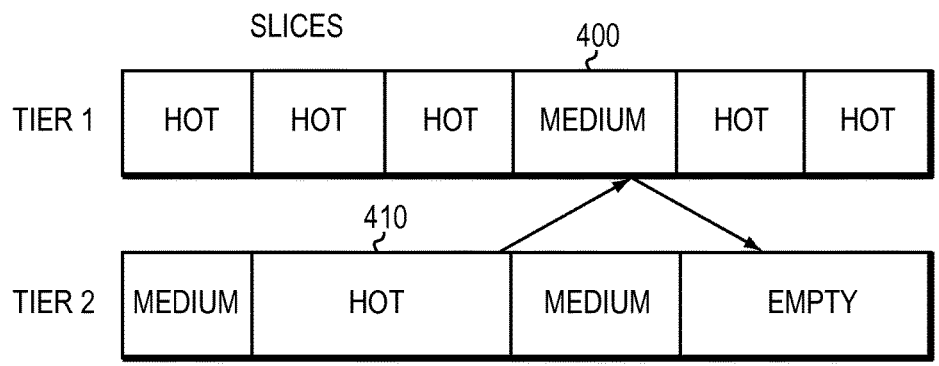
Figure 6:
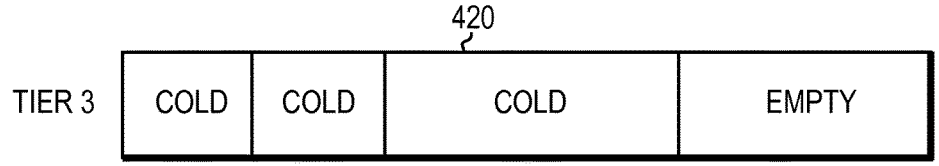
Figure 6:
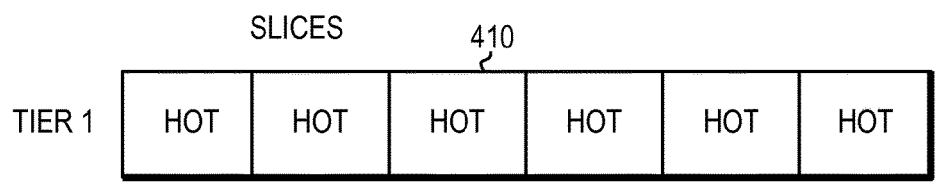
Figure 6:
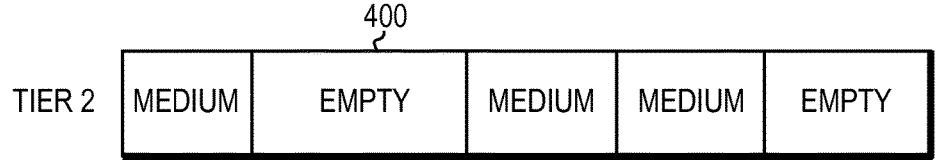
Figure 6:
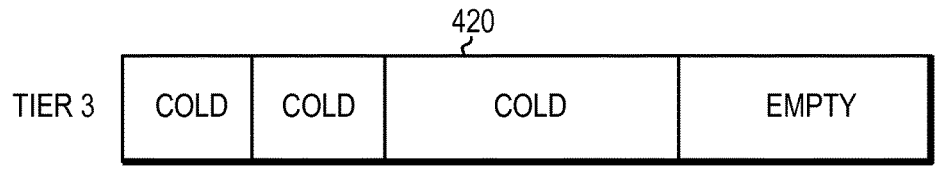

Referring now to FIG. 6 that illustrates a process of relocating slices from a first storage tier of a storage pool to a second storage tier of the storage pool in a data storage system. In this embodiment, there is a hot slice 410 in Tier 2 and a medium slice 400 in Tier 1; however, Tier 1 has no space to accommodate an additional tier. Therefore, in this embodiment, the medium slice 400 on Tier 1 is migrated to Tier 2 and the hot slice 410 in Tier 2 is migrated to Tier 1. Note, that it was the need to migrate the hot slice 410 to Tier 1 that caused the medium slice 400 to be shifted to Tier 2. In this example, it may have been more effective to have the medium slice located in Tier 1. Also note that slices may change temperature based on data access request. Therefore, a slice's temperature may rise or fall over time. The slice's temperature may be the result of any number of calculations based on data access or data write requests to that slice.

Figure 7:
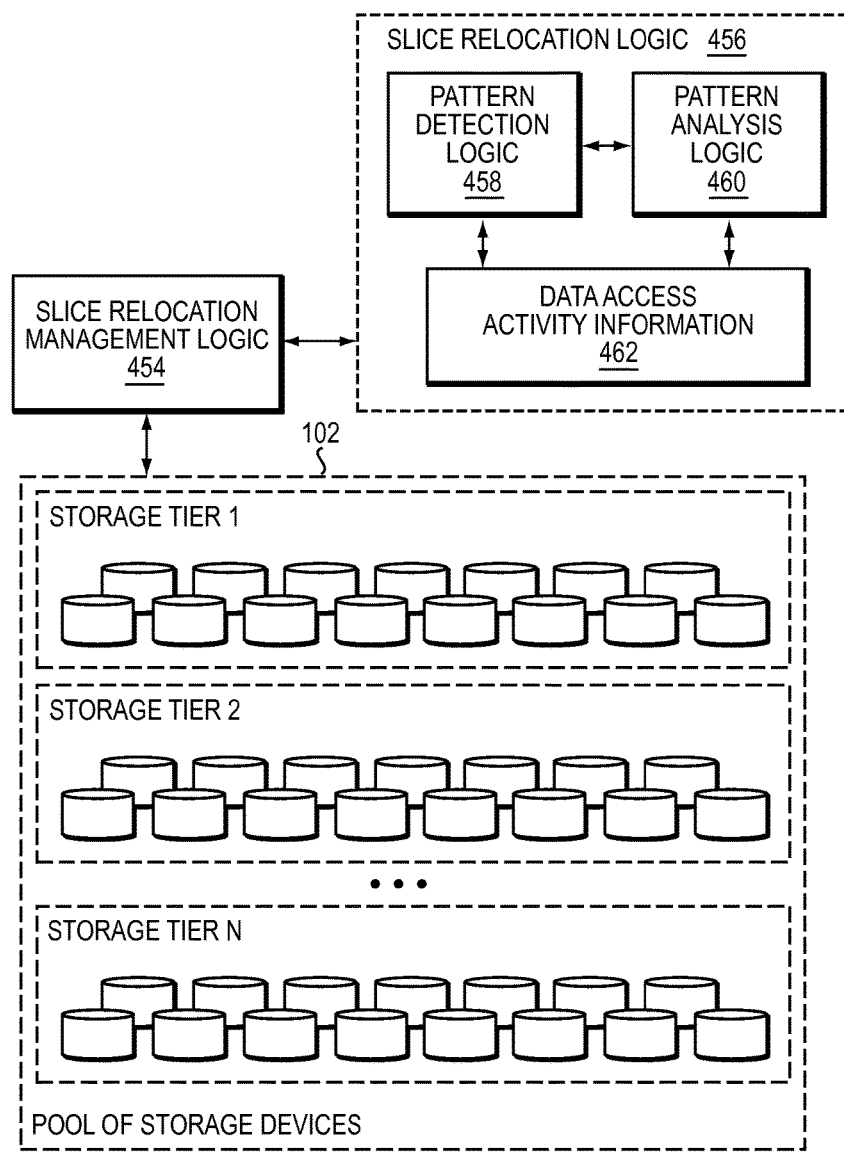

Referring to FIG. 7, shown is a more detailed representation of components that may be included in an embodiment using the techniques described herein. In at least some embodiments of the current technique, a storage pool may include one or more RAID groups. A RAID group may be associated with data devices, such as the physical devices 60a-60b discussed herein, so that, for example, there is one or more data devices for each RAID group, any portion of a data device for any portion of the pools of storage, and/or any combinations thereof. Further, data devices associated with a storage pool may have different characteristics, such as speed, cost, reliability, availability, security and/or other characteristics. Further, storage pool 102 may include one or more storage tiers such that each storage tier has different performance characteristics.

In at least one embodiment of the current technique, slice relocation management logic 454 (also referred to as "Auto-Tiering policy engine (PE)" or "slice relocation process") may shift hot slices of a logical volume to upper tiers and cold slices of the logical volume down to lower tiers. The goal of the slice relocation process is to put hot, frequently accessed slices to higher tiers and maximize the utilization of these high tiers, which include faster but more expensive drives such as a flash storage drives. Slice relocation management logic 454 relocates a slice based on the temperature of the slice. Generally, the temperature of a slice is determined based on I/O activity directed to the slice. I/O activity of a slice is an indicator of current I/O load of the slice. Slice I/O activity is computed using raw slice statistics. The computation may be done in any of several different ways. The specific computation to use may depend on the system I/O traffic pattern. In at least some cases, the simplest and most straightforward calculation is to use total slice I/O counts as I/O activity, such that the slice I/O load is the moving average of slice I/O counts.

In at least one embodiment of the current technique, slice relocation logic 456 includes pattern detection logic 458 and pattern analysis logic 460. Pattern detection logic 458 may include an I/O pattern detector which detects an I/O pattern by working in conjunction with slice relocation management logic 454 to evaluate data access activity information 462 and determine whether a time-based I/O pattern exists in the data access activity information. It should be noted that pattern detection logic 458 may reside on a storage array or may reside on a system that may execute outside the storage array.

In at least one embodiment of the current technique, raw statistical I/O information regarding slice I/O operations is gathered and stored as part of data access activity information 462. The data access activity information 462 also includes timestamp information for each I/O activity such that a time based IO pattern may be detected by pattern detection logic 458. Thus, raw statistical I/O information regarding slice I/O operations is gathered over a long period of time and stored as data access activity information 462 which is evaluated by pattern detector logic 458. Different types of policies may be used by pattern detector logic 458 for detecting different types of I/O patterns such as an I/O pattern based on I/O activities on a daily basis, an I/O pattern based on I/O activities on a weekly basis, an I/O pattern based on I/O activities on a monthly basis, and an I/O pattern based on I/O activities on a specific time interval based on a specific set of storage pools or LUNs.

In at least one embodiment of the current technique, pattern detection logic 458 evaluates data access activity information 462 and makes a determination whether an I/O pattern exists. Further, pattern analysis logic 460 evaluates a pattern detected by pattern detection logic 458 and computes a final predicted temperature. Thus, if a pattern is detected with a high confidence factor (such as the temperature of a slice has the same or similar value on the first day of each month) with a low error margin, the temperature indicated by the pattern is used by the slice relocation management logic 454 to determine a slice relocation candidate list. However, based on evaluation, if no pattern is detected for a slice and a confidence factor is low (such as the temperature of a slice is random on each day), the temperature based on EMA technique is used by the slice relocation management logic 454 to determine a slice relocation candidate list. The temperature that has a high confidence factor is selected by the slice relocation management logic 454 to determine a slice relocation candidate list. In case, no relocation window has been scheduled for a storage pool prior to the occurrence of the peak I/O time period, pattern detector logic 458 enables a storage system to automatically activate a schedule for relocating slices. Thus, in at least one embodiment of the current technique, slice relocation management logic 454 is able to determine the temperature of a slice intelligently by efficiently managing different types of I/O loads. Further, slice relocation management logic 454 is able to automatically and proactively relocate data with a high accuracy based on a predicted temperature.

Thus, in at least one embodiment of the current technique, a framework is provided to detect an I/O pattern based on specific criteria such as a time-based pattern and to apply predictive I/O analysis techniques based on the I/O pattern detected by the framework. Further, in at least one embodiment of the current technique, a long term I/O pattern is detected and a temperature for a slice is determined based on a weighted scheme. A weight is assigned to a temperature based on whether a pattern is detected upon analysis of data activity information 462. A weight assigned to the temperature of a slice is based on reliability of a long term I/O pattern detected for the slice. If no long term I/O pattern is detected for a slice, the current technique determines the temperature for the slice by using the conventional EMA technique based on moving exponential average of I/O statistical information. Thus, in at least one embodiment of the current technique, the temperature for each slice of a storage pool is determined periodically based on a specific time interval, analysis is performed to evaluate whether a long term I/O pattern exists, and slices are relocated based on the analysis and detection of the long term I/O pattern.

In at least one embodiment of the current technique, following are the steps performed to determine a predicted temperature based on a weight for a slice. First, I/O statistics are gathered periodically at a specific time interval, the temperature for each slice of a storage pool is computed and saved in data access activity information 462. Pattern detection logic 458 evaluates information stored in data access activity information 462 and determines whether a pattern exists in the information gathered and stored in data access activity information 462. Based on whether a pattern is detected, a predicted temperature for a slice and a confidence factor regarding the predicted temperature is determined based on applying predictive analysis techniques (e.g., statistical techniques). The confidence factor for a slice indicates the accuracy with which a pattern is detected for the slice. A confidence factor for a slice is computed based on factors such as the number of samples gathered for I/O activity information of the slice and whether a pattern is detected based on the I/O activity information. Further, pattern analysis logic 460 performs analysis of information determined by pattern detection logic 458 and computes the final temperature for a slice based on the confidence factor and respective weights assigned to the predicted temperature of the slice and conventional temperature of the slice based on EMA technique. If a high weight is assigned to the predicted temperature for a slice based on determination of a long term I/O pattern, the predicted temperature is used as the final temperature of the slice. However, if a high weight is assigned to the conventional temperature for a slice based on the EMA technique, the conventional temperature is used as the final temperature for the slice. Thus, based on the analysis and the final temperature determined for a slice, the slice is selected for a slice relocation candidate list for relocating the slice.

Figure 8:
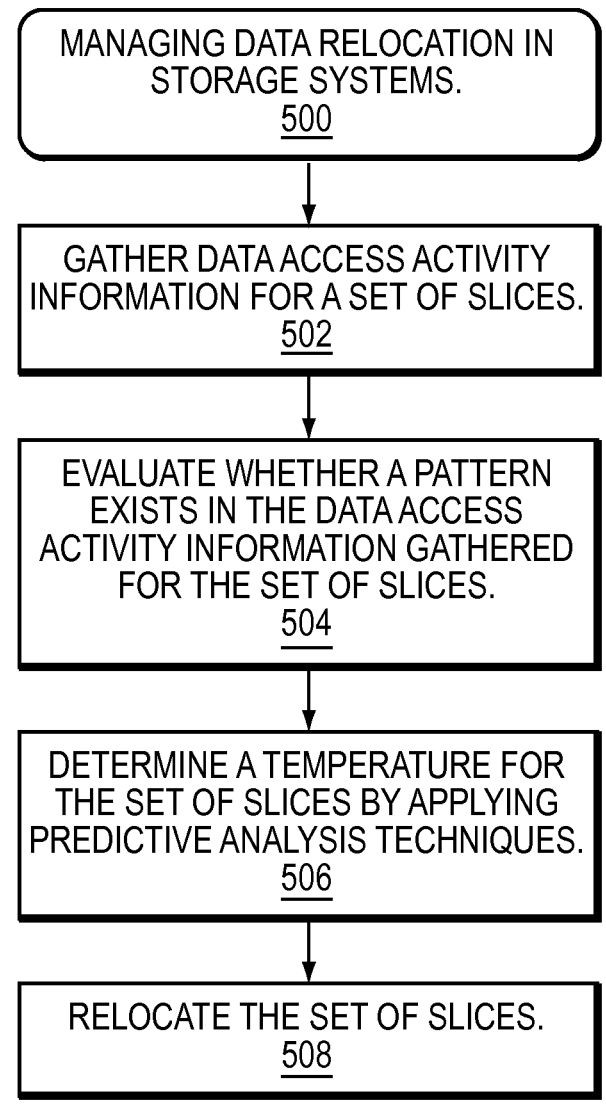
FIG. 8 is a flow diagram illustrating processes that may be used in connection with techniques herein.

Referring to FIG. 8, shown is a more detailed flow diagram illustrating managing data relocation in storage systems. With reference also to FIGS. 1-7, in at least one embodiment of the current technique, data relocation is managed in a storage system (step 500). Data access activity information for a set of slices of a storage tier is gathered (step 502). The data access activity information is analyzed and evaluated as to whether a pattern exists in the data access activity information (step 504). A temperature for each slice of the set of slices is determined by applying a predictive analysis technique on the data access activity information (step 506). Each slice of the set of slices is relocated based on the temperature determined for each slice (step 508).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing data relocation in storage systems, the method comprising:

gathering a set of data access activity information over a long period of time for a set of slices of a storage tier in a data storage system periodically at a specific time interval for migrating the set of slices from the storage tier to another storage tier, wherein the data storage system includes a first storage tier and a second storage tier configured such that performance characteristics associated with the first storage tier is superior to the second storage tier, wherein the set of data access activity information includes timestamp information for each I/O activity for detecting a time-based I/O pattern;

determining whether a long term I/O pattern indicating a long term trend exists by evaluating the set of data access activity information, wherein the long term I/O pattern includes the time-based I/O pattern based on a specific pattern of access of data during a specific period of time, wherein the time-based I/O pattern indicates that data of a slice, is accessed repeatedly during the specific period of time over the long period of time indicating the long term trend;

based on the long term I/O pattern determined from the set of data access activity information, determining a respective predictive temperature and a confidence factor associated with the respective predictive temperature for each slice of the set of slices by applying a predictive analysis technique on the set of data access activity information, wherein the confidence factor for a slice indicates accuracy and an error margin with which the long term I/O pattern is determined for the slice, and is computed based on a set of factors, the set of factors including a number of samples gathered in the set of data access activity information and whether the long term I/O pattern is determined from the set of data access activity information, wherein a respective predictive temperature is computed based on a weight assigned to a temperature based on the confidence factor with which the long term I/O pattern is determined; and based on the determination, managing relocation of each slice of the set of slices based on the respective predictive temperatures determined for respective slices upon detecting the long term I/O pattern with a high confidence factor, wherein each slice of the set of slices is proactively relocated based on a respective predictive temperature and the confidence factor determined for the respective slice, wherein proactively relocating a slice enables the data storage system to relocate the slice to a hot storage tier prior to an increase in I/O activity for the slice.

2. The method of claim 1, wherein the long term I/O pattern is detected based on a set of policies.

3. The method of claim 1, wherein the data access activity information includes I/O statistics information, wherein the I/O statistics information is gathered over a period of time.

4. The method of claim 1, further comprising:

based on the determination, of respective predicted temperature for each slice, associating a weight to the predicted temperature for each slice of the set of slices; and determining a final temperature for each slice of the set of slices based on the weight assigned to the predicted temperature.

5. The method of claim 1, wherein an auto-tiering policy engine identifies the set of slices for relocation based on temperature information of the set of slices.

6. The method of claim 1, wherein the predictive analysis technique includes a statistical analysis technique.

7. The method of claim 1, wherein includes the storage tier includes a set of logical volumes, wherein a logical volume of the set of logical volumes comprises a set of slices, each slice of the set of slices is a logical representation of a subset of physical disk storage.

8. The method of claim 7, wherein a logical volume of the set of logical volumes includes a disk drive system comprising a plurality of Redundant Array of Inexpensive Disks (RAID) systems, each RAID system of the plurality of RAID systems having a first disk drive and a second disk drive.

9. A system for use in managing data relocation in storage systems, the system comprising a processor configured to:
gather a set of data access activity information over a long period of time for a set of slices of a storage tier in a data storage system periodically at a specific time interval for migrating the set of slices from the storage tier to another storage tier, wherein the data storage system includes a first storage tier and a second storage tier configured such that performance characteristics associated with the first storage tier is superior to the second storage tier, wherein the set of data access activity information includes timestamp information for each I/O activity for detecting a time-based I/O pattern;
determine whether a long term I/O pattern indicating a long term trend exists by evaluating the set of data access activity information, wherein the long term I/O pattern includes the time-based I/O pattern based on a specific pattern of access of data during a specific period of time, wherein the time-based I/O pattern indicates that data of a slice is accessed repeatedly during the specific period of time over the long period of time indicating the long term trend;
based on the long term I/O pattern determined from the set of data access activity information, determine a respective predictive temperature and a confidence factor associated with the respective predictive temperature for each slice of the set of slices by applying a predictive analysis technique on the set of data access activity information, wherein the confidence factor for a slice indicates accuracy and an error margin with which the long term I/O pattern is determined for the slice, and is computed based on a set of factors, the set of factors including a number of samples gathered in the set of data access activity information and whether the long term I/O pattern is determined from the set of data access activity information, wherein a respective predictive temperature is computed based on a weight assigned to a temperature based on the confidence factor with which the long term I/O pattern is determined; and
based on the determination, manage relocation of each slice of the set of slices based on the respective predictive temperatures determined for respective slices upon detecting the long term I/O pattern with a high confidence factor, wherein each slice of the set of slices is proactively relocated based on a respective predictive temperature and the confidence factor determined for the respective slice, wherein proactively relocating a slice enables the data storage system to relocate the slice to a hot storage tier prior to an increase in I/O activity for the slice.

10. The system of claim 9, wherein the long term I/O pattern is detected based on a set of policies.

11. The system of claim 9, wherein the data access activity information includes I/O statistics information, wherein the I/O statistics information is gathered over a period of time.

12. The system of claim 9, further comprising:
based on the determination of respective predicted temperature for each slice, associate a weight to the predicted temperature for each slice of the set of slices; and
determine a final temperature for each slice of the set of slices based on the weight assigned to the predicted temperature.

13. The system of claim 9, wherein an auto-tiering policy engine identifies the set of slices for relocation based on temperature information of the set of slices.

14. The system of claim 9, wherein the predictive analysis technique includes, a statistical analysis technique.

15. The system of claim 9, wherein includes the storage tier includes a set of logical volumes, wherein a logical volume of the set of logical volumes comprises a set of slices, each slice of the set of slices is a logical representation of a subset of physical disk storage.

16. The system of claim 15, wherein a logical volume of the set of logical volumes includes a disk drive system comprising a plurality of Redundant Array of Inexpensive Disks (RAID) systems, each RAID system of the plurality of RAID systems having a first disk drive and a second disk drive.

* * * * *